United States Patent
Chi et al.

(10) Patent No.: US 8,598,257 B2
(45) Date of Patent: Dec. 3, 2013

(54) POLYCARBONATE RESIN COMPOSITION

(75) Inventors: Jun Ho Chi, Uiwang-si (KR); Jong Chan Hur, Uiwang-si (KR); O Sung Kwon, Uiwang-si (KR); Bok Nam Jang, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 32 days.

(21) Appl. No.: 13/249,608

(22) Filed: Sep. 30, 2011

(65) Prior Publication Data

US 2012/0172497 A1 Jul. 5, 2012

(30) Foreign Application Priority Data

Dec. 30, 2010 (KR) .................. 10-2010-0139684
Apr. 22, 2011 (KR) .................. 10-2011-0037950

(51) Int. Cl.
*C08K 5/3475* (2006.01)
*C08K 5/10* (2006.01)

(52) U.S. Cl.
USPC ............. 524/91; 524/295; 524/296; 524/297; 524/298

(58) Field of Classification Search
USPC ..................... 524/91, 295, 296, 297, 298
See application file for complete search history.

(56) References Cited

U.S. PATENT DOCUMENTS 6,884,864 B2 * 4/2005 Masuki et al. ................ 528/196
7,081,213 B2 * 7/2006 Kr hnke et al. ............... 252/403

* cited by examiner

*Primary Examiner* — Kriellion Sanders
(74) *Attorney, Agent, or Firm* — Additon, Higgins, Pendleton & Ashe, P.A.

(57) ABSTRACT

Disclosed are a polycarbonate resin composition and a molded product formed of the same. The polycarbonate resin composition includes a polycarbonate resin and three types of UV stabilizers including a first benzotriazole UV stabilizer, a second benzotriazole UV stabilizer, and a bismalonate UV stabilizer to improve heat stability, weather resistance, and visible light transmittance.

16 Claims, No Drawings

POLYCARBONATE RESIN COMPOSITION

CROSS-REFERENCE TO RELATED APPLICATIONS

This application claims priority under 35 USC Section 119 from Korean Patent Application No. 10-2010-0139684, filed Dec. 30, 2010, and Korean Patent Application No. 10-2011-0037950, filed Apr. 22, 2011, the entire disclosure of each of which is incorporated herein by reference.

FIELD OF THE INVENTION

The present invention relates to a polycarbonate resin composition and a molded product formed of the same.

BACKGROUND OF THE INVENTION

Polycarbonate is a plastic material having a heat deflection temperature of 135° C. or more and can be prepared by melt polycondensation or interfacial polycondensation. Since polycarbonate is transparent and has excellent mechanical properties, it is widely used for exterior decorative products including outdoor structures or indoor products exposed to fluorescent light.

However, due to inferior weather resistance, like most plastics, upon exposure to ultraviolet (UV) radiation, polycarbonate exhibits yellowing, lose of surface gloss, and increased haze. Thus its use in certain applications such as exterior decorative products can be particularly limited.

To protect polycarbonate from UV radiation, UV stabilizers can be added thereto. Although this method is the simplest way to protect polycarbonate from UV radiation, inherent properties of UV stabilizers added to a polycarbonate resin composition can result in limited improvement of an initial yellowness index, heat stability, and weather resistance of the polycarbonate resin composition. Particularly, when conventional UV stabilizers are used alone or as mixtures, polycarbonate resin compositions do not exhibit visible light transmittance. Visible light transmittance is an essential property for polycarbonate resin compositions for exterior decorative purposes.

SUMMARY OF THE INVENTION

The present invention relates to a polycarbonate resin composition which can exhibit heat stability and weather resistance, including visible light transmittance, and a molded product formed of the same. In exemplary embodiments, the polycarbonate resin composition includes a polycarbonate resin; a first benzotriazole UV stabilizer represented by Formula 1; a second benzotriazole UV stabilizer represented by Formula 2; a bismalonate UV stabilizer represented by Formula 3; and a phosphorus heat stabilizer.

The first UV stabilizer may be present in an amount of about 0.05 to about 0.3 phr based on about 100 parts by weight of the polycarbonate resin.

The second UV stabilizer may be present in an amount of about 0.05 to about 0.3 phr based on about 100 parts by weight of the polycarbonate resin.

The bismalonate UV stabilizer may be present in an amount of about 0.05 to about 0.3 phr based on about 100 parts by weight of the polycarbonate resin.

The resin composition may further include a sulfonic acid compound.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A specimen formed of a polycarbonate resin composition according to exemplary embodiments of the present invention can have an initial yellowness index (YI) of about 3.9 or less. The initial yellowness index can be measured by any method known in the art, in which a specimen is formed by injection molding pellets formed of the polycarbonate resin composition and the initial yellowness index is measured according to ASTM D1925. In exemplary embodiments, the specimen may have an initial yellowness index of about 2.0 to about 3.0.

Further, when the specimen formed of the polycarbonate resin composition is left at 320° C. for 5 minutes, a change in yellowness index ($\Delta$YI) is about 2.4 or less. Thus, the specimen of the polycarbonate resin composition provides heat stability after exposure to high temperatures. The change in yellowness index associated with heat stability can be measured by any method known in the art. For example, the polycarbonate resin composition can be left in a cylinder at a molding temperature of 320° C. and a mold temperature of 70° C. for 5 minutes and then formed into a specimen through injection molding. The yellowness indices of a specimen before being left in the cylinder and of the specimen after being left in the cylinder are measured in accordance with ASTM D1925, and the difference between the yellowness indices is calculated, thereby obtaining a change in yellowness index associated with heat stability. In exemplary embodiment, the change in yellowness index ($\Delta$YI) associated with heat stability may be about 1.6 to about 2.3.

Further, when the specimen formed of the polycarbonate resin composition is irradiated with light having a wavelength of 340 nm and an intensity of 0.35 W/m$^2$ for 1,000 hours, a change in yellowness index ($\Delta$YI) can be about 8.2 or less. Thus, the specimen of the polycarbonate resin composition can provide excellent weather resistance. The change in yellowness index ($\Delta$YI) associated with weather resistance may be obtained as follows. A specimen formed of the resin composition can be subjected to irradiation by light with a wavelength of 340 nm and an intensity of 0.35 W/m$^2$ for 1,000 hours. The yellowness indices of a specimen before irradiation and of the specimen after irradiation are measured in accordance with ASTM D1925, and the difference between the yellowness indices is calculated, thereby obtaining a change in yellowness index associated with weather resistance. In exemplary embodiments, the change in yellowness index ($\Delta$YI) associated with weather resistance may be about 6.0 to about 6.8.

Further, the specimen formed of the polycarbonate resin composition can have a visible light transmittance of about 86% or more, for example about 86 to about 96%. The visible light transmittance may be measured on a specimen (thickness: 2.5 mm) obtained at a molding temperature of 290° C. and a mold temperature of 70° C. using a hazemeter.

In one embodiment, the resin composition may include a polycarbonate resin, a first benzotriazole UV stabilizer, a second benzotriazole UV stabilizer, a bismalonate UV stabilizer, and a phosphorus heat stabilizer.

Polycarbonate Resin

The polycarbonate resin is not particularly limited. In exemplary embodiments, the polycarbonate resin may be a linear polycarbonate resin, a branched polycarbonate resin, a polyester carbonate copolymer resin, or a combination thereof.

The polycarbonate resin may have a weight average molecular weight of about 10,000 to about 100,000 g/mol, for example about 15,000 to about 50,000 g/mol. When the polycarbonate resin has a weight average molecular weight within this range, the polycarbonate resin may have improved initial yellowness index, heat stability and weather resistance, and may have improved visible light transmittance.

The polycarbonate resin may be prepared by melt polymerization or interfacial polycondensation of an aromatic dihydroxyl compound.

In one embodiment, the polycarbonate resin may be prepared by transesterification of an aromatic dihydroxyl compound represented by Formula 4 or an aromatic carbonate derivative compound represented by Formula 5 and diaryl carbonate in the presence of an alkali metal catalyst, an alkaline earth metal catalyst, or a combination thereof.

The aromatic dihydroxyl compound may be represented by Formula 4.

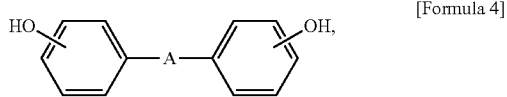

[Formula 4]

wherein A is a single bond, C1 to C5 alkylene, C1 to C5 alkylidene, C5 to C6 cycloalkylidene, —S—, or —SO2-.

Examples of the aromatic dihydroxyl compound represented by Formula 4 may include, without being limited to, 4,4'-dihydroxydiphenyl, 2,2-bis(4-hydroxyphenyl)propane (also referred to as bisphenol A), 2,4-bis(4-hydroxyphenyl)-2-methylbutane, 1,1-bis(4-hydroxyphenyl)cyclohexane, 2,2-bis(3-chloro-4-hydroxyphenyl)propane, 2,2,-bis(3,5-dichloro-4-hydroxyphenyl)propane, and the like, and combinations thereof. In exemplary embodiments, the aromatic dihydroxyl compound represented by Formula 4 may include 2,2-bis(4-hydroxyphenyl)propane, 2,2,-bis(3,5-dichloro-4-hydroxyphenyl)propane, 1,1-bis(4-hydroxyphenyl)cyclohexane, or a combination thereof.

The aromatic dihydroxyl compound may be used at a mole ratio of about 0.7 to about 1.5, for example about 0.8 to about 1.2, with respect to diaryl carbonate. Within this range, excellent mechanical strength can be obtained.

The aromatic carbonate derivative compound may be represented by Formula 5.

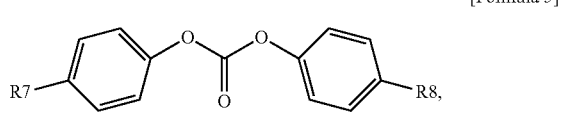

[Formula 5]

wherein R7 is hydrogen, t-butyl, or p-cumyl, and R8 is t-butyl or p-cumyl.

A mixture of about 5 to about 40 mol % of the aromatic carbonate derivative compound and about 60 to about 95 mol % of the diaryl carbonate may be used, without being limited thereto. The aromatic carbonate derivative compound can be added before or in the middle of transesterification and reacted in the same reaction system.

Examples of the diaryl carbonate may include, without being limited to, diphenyl carbonate, ditolyl carbonate, bis (chlorophenyl)carbonate, m-cresyl carbonate, dinaphthyl carbonate, bis(diphenyl)carbonate, diethyl carbonate, dimethyl carbonate, dibutyl carbonate, dicyclohexyl carbonate, and the like, and combinations thereof.

The catalyst composed of the alkali metal, the alkaline earth metal, or the mixture thereof may include hydroxides and oxides of alkali and/or alkaline earth metals. For example, alkali metal and alkaline earth metal catalysts may include, without being limited thereto, LiOH, NaOH, KOH, and the like, and combinations thereof. The amount of catalyst may be determined based on the amount of aromatic dihydroxyl compound or aromatic carbonate derivative compound. In one embodiment, the amount of catalyst may be in a range of about $1\times10^{-8}$ to about $1\times10^{-3}$ based on about 1 mole of the aromatic dihydroxyl compound or aromatic carbonate derivative compound. When the catalyst is used in an amount within this range, sufficient reactivity can be obtained and generation of by-products due to side reactions can be minimized, thereby improving heat stability and color stability.

Transesterification may be performed under decompression at a temperature of about 150 to about 300° C., for example about 160 to about 280° C., and as another example about 190 to about 270° C. When the temperature is within this range, a proper reaction rate can be obtained and side reactions can be reduced.

Transesterification may be performed under decompression conditions of about 75 torr or less, for example about 30 torr or less, and as another example about 1 torr or less for at least about 10 minutes or more, for example about 15 minutes to about 24 hours, and as another example about 15 minutes to about 12 hours, taking into consideration reaction rate and reduction of side reactions.

For example, the polycarbonate resin may be prepared through a reaction conducted at a temperature of about 160 to about 260° C. for about 2 to about 9 hours.

In another embodiment, polycarbonate may be prepared by reacting the aromatic dihydroxyl compound represented by Formula 4, e.g., 2,2-bis(4-hydroxyphenyl)propane, with phosgene in the presence of an oxygen binder and a solvent. Examples of the oxygen binder may include without limitation sodium hydroxide, pyridine, and the like, and combinations thereof. Examples of the solvent may include without limitation methylene chloride, chlorobenzene, xylene, and the like, and combinations thereof.

First Benzotriazole UV Stabilizer

The first benzotriazole UV stabilizer may be a UV stabilizer represented by Formula 1.

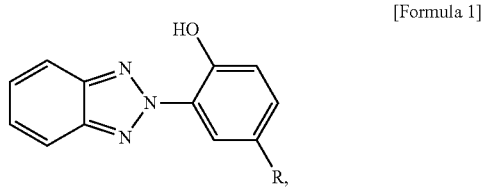

[Formula 1]

wherein R is hydrogen, linear or branched C1 to C20 alkyl, C6 to C20 aryl, or C6 to C20 aryl substituted by C1 to C10 alkyl.

In exemplary embodiments, R may be linear or branched C5 to C10 alkyl.

In exemplary embodiments, the first benzotriazole UV stabilizer may be 2-(2H-benzotriazolyl)-4-(1,1,3,3-tetramethylbutyl)phenol.

The polycarbonate resin composition may include the first benzotriazole UV stabilizer in an amount of about 0.05 to about 0.3 phr, for example about 0.05 to about 0.15 phr, and as another example about 0.1 to about 0.15 phr based on about 100 parts by weight of the polycarbonate resin.

As used herein, "phr" refers to "parts per hundred resin," a unit commonplace in the polymer industry for the purpose of characterizing compositions including combinations or mixtures of components.

In some embodiments, the polycarbonate resin composition may include the first benzotriazole UV stabilizer in an amount of about 0.05, 0.06, 0.07, 0.08, 0.09, 0.1, 0.15, 0.2, 0.25, or 0.3 phr. Further, according to some embodiments of the present invention, the amount of the first benzotriazole UV stabilizer can be in a range from about any of the foregoing amounts to about any other of the foregoing amounts.

When the polycarbonate resin composition includes the first benzotriazole UV stabilizer in an amount within this range, the UV stabilizer can provide enhanced weather resistance and may not lose essential functions as a UV stabilizer.

Second Benzotriazole UV Stabilizer

The second benzotriazole UV stabilizer may be a UV stabilizer represented by Formula 2.

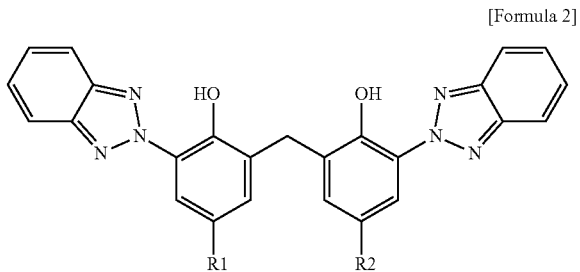

[Formula 2]

wherein R1 and R2 are the same or different and are each independently hydrogen, linear or branched C1 to C20 alkyl, C6 to C20 aryl, or C6 to C20 aryl substituted by C1 to C10 alkyl.

In exemplary embodiments, R1 and R2 each may independently be linear or branched C5 to C10 alkyl.

In exemplary embodiments, the second benzotriazole UV stabilizer may be 2,2'-methylenebis[6-(2H-benzotriazol-2-yl)-4-(1,1,3,3-tetramethylbutyl)phenol.

The polycarbonate resin composition may include the second benzotriazole UV stabilizer in an amount of about 0.05 to about 0.3 phr, for example about 0.05 to about 0.2 phr, and as another example about 0.1 to about 0.15 phr, based on about 100 parts by weight of the polycarbonate resin.

In some embodiments, the polycarbonate resin composition may include the second benzotriazole UV stabilizer in an amount of about 0.05, 0.06, 0.07, 0.08, 0.09, 0.1, 0.15, 0.2, 0.25, or 0.3 phr. Further, according to some embodiments of the present invention, the amount of the second benzotriazole UV stabilizer can be in a range from about any of the foregoing amounts to about any other of the foregoing amounts.

When the polycarbonate resin composition includes the second benzotriazole UV stabilizer in an amount within this range, the UV stabilizer can have enhanced weather resistance and may not lose essential functions as a UV stabilizer.

Bismalonate UV Stabilizer

The bismalonate UV stabilizer may be a UV stabilizer represented by Formula 3.

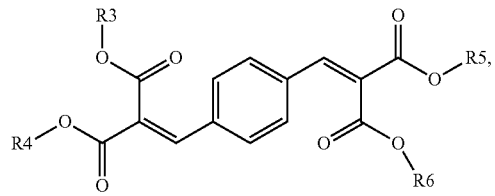

[Formula 3]

wherein R3, R4, R5, and R6 are the same or different and are each independently hydrogen, linear or branched C1 to C20 alkyl, C6 to C20 aryl, or C6 to C20 aryl substituted by C1 to C10 alkyl.

In exemplary embodiments, R3, R4, R5, and R6 each may independently be linear or branched C1 to C5 alkyl.

In exemplary embodiments, the bismalonate UV stabilizer may be tetraethyl 2,2'-(1,4-phenylenedimethylidyne)bismalonate.

The polycarbonate resin composition may include the bismalonate UV stabilizer in an amount of about 0.05 to about 0.3 phr, for example about 0.05 to about 0.2 phr, and as another example about 0.1 to about 0.15 phr, based on about 100 parts by weight of the polycarbonate resin. In some embodiments, the polycarbonate resin composition may include the bismalonate UV stabilizer in an amount of about 0.05, 0.06, 0.07, 0.08, 0.09, 0.1, 0.15, 0.2, 0.25, or 0.3 phr. Further, according to some embodiments of the present invention, the amount of the bismalonate UV stabilizer can be in a range from about any of the foregoing amounts to about any other of the foregoing amounts.

When the polycarbonate resin composition includes the bismalonate UV stabilizer in an amount within this range, heat stability and an initial yellowness index can be improved.

The polycarbonate resin composition may include the first benzotriazole UV stabilizer, the second benzotriazole UV stabilizer, and the bismalonate UV stabilizer at a weight ratio of about 1:1 to about 3:1 to about 3, for example about 1:1 to about 1.5:1 to about 1.5. When the polycarbonate resin composition includes the first benzotriazole UV stabilizer, the second benzotriazole UV stabilizer, and the bismalonate UV stabilizer in a weight ratio within this range, the polycarbonate resin composition can have improved initial yellowness index, heat stability, weather resistance, and visible light transmittance.

Phosphorus Heat Stabilizer

Examples of the phosphorus heat stabilizer may include without limitation tris(2,4-di-tert-butylphenyl)phosphate, triethyl phosphate, trimethyl phosphate, diphenyl isooctyl phosphite, distearyl pentaerythritol diphosphite, and the like, and combinations thereof. In exemplary embodiments, the phosphorus heat stabilizer can be tris(2,4-di-tert-butylphenyl)phosphate.

The polycarbonate resin composition may include the phosphorus heat stabilizer in an amount of about 0.01 to about 0.2 phr, for example about 0.03 to about 0.1 phr, based on about 100 parts by weight of the polycarbonate resin. In some embodiments, the polycarbonate resin composition may include the phosphorus heat stabilizer in an amount of about 0.01, 0.02, 0.03, 0.04, 0.05, 0.06, 0.07, 0.08, 0.09, 0.1, or 0.2 phr. Further, according to some embodiments of the present invention, the amount of the phosphorus heat stabilizer can be in a range from about any of the foregoing amounts to about any other of the foregoing amounts.

When the polycarbonate resin composition includes the phosphorus heat stabilizer in an amount within this range, heat stability and an initial yellowness index can be improved.

In another embodiment, the resin composition may further include a sulfonic acid compound.

Examples of the sulfonic acid compound may include, without being limited to, tetrabutylphosphonium octylsulfonate, tetrabutylphosphonium decylsulfonate, tetramethylphosphonium benzene sulfonate, tetrabutylphosphonium benzene sulfonate, tetrabutylphosphonium dodecylbenzene sulfonate, tetrahexylphosphonium dodecylbenzene sulfonate, tetraoctylphosphonium dodecylbenzene sulfonate, tetramethylammonium decylsulfonate, tetraethylammonium benzene sulfonate, tetrabutylammonium dodecylbenzene sulfonate, methylbenzene sulfonate, ethylbenzene sulfonate, butylbenzene sulfonate, octylbenzene sulfonate, phenylbenzene sulfonate, methyl p-toluene sulfonate, ethyl p-toluene sulfonate, butyl p-toluene sulfonate, octyl p-toluene sulfonate, phenyl p-toluene sulfonate, methyl dodecylsulfonate, ethyl hexadecyl sulfonate, propylnonyl sulfonate, butyl decylsulfonate, and the like, and combinations thereof.

The sulfonic acid compound may be a sulfonic acid ester compound represented by Formula 6.

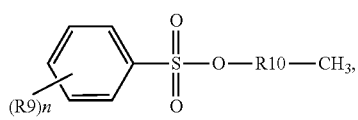

[Formula 6]

wherein each R9 is the same or different and is independently C1 to C20 alkyl or halogen substituted C1 to C20 alkyl, R10 is C11 to C20 alkylene or halogen substituted C11 to C20 alkylene, and n is an integer from 0 to 5.

Examples of the sulfonic acid ester compound may include without limitation dodecyl p-toluenesulfonate, octadecyl p-toulenesulfonate, dodecyl(dodecyl benzene)sulfonate, octadecyl(dodecyl benzene)sulfonate, and the like, and combinations thereof.

The polycarbonate resin composition may include the sulfonic acid compound in an amount of about $1 \times 10^{-5}$ to about $5 \times 10^{-3}$ phr, for example about $5 \times 10^{-5}$ to about $2 \times 10^{-3}$ phr, and as another example about $1 \times 10^{-4}$ to about $1 \times 10^{-3}$ phr, based on about 100 parts by weight of the polycarbonate resin.

When the polycarbonate resin composition includes the sulfonic acid compound in an amount within this range, heat stability and an initial yellowness index can be improved.

In still another embodiment, the resin composition may further include one or more additives. Examples of the additives include without limitation antimicrobial agents, release agents, antioxidants, compatibilizers, inorganic additives, fillers, plasticizers, impact modifiers, admixtures, coloring agents such as dyes or pigments, stabilizers, lubricants, antistatic agents, weatherproofing agents, UV blocking agents, and the like, and combinations thereof.

The polycarbonate resin composition may include the additive, without being limited to, in an amount of about $1 \times 10^{-4}$ to about 1 phr based on about 100 parts by weight of the polycarbonate resin.

The polycarbonate resin composition may be prepared by mixing the above components using techniques known in the art.

The invention also provides a molded product which is formed of the polycarbonate resin composition. Method of manufacturing a molded product using the resin composition are known to those skilled in the art. Non-limiting examples of the molded products include, without being limited to, transparent members and films for vehicles.

Hereinafter, the constitution and functions of the present invention will be explained in more detail with reference to the following examples. These examples are provided for illustrative purposes only and are not to be in any way construed as limiting the present invention.

A description of details apparent to those skilled in the art will be omitted herein.

PREPARATION EXAMPLE 1

Preparation of Polycarbonate Resin 3.0 kg of 2,2-bis(4-hydroxyphenyl)propane (bisphenol A), 3.1 kg of diphenyl carbonate, and 100 ppb of KOH (based on 1 mol of bisphenol A) are sequentially added to a reactor, and oxygen is eliminated from the reactor using nitrogen. The reactor is heated to 160° C. and then up to 190° C. and the reactants are reacted for 6 hours. After 6 hours, the reactor is heated to 220° C. and left at a pressure of 70 torr for 1 hour. The reactor is then heated to 260° C. and left at a pressure of 20 torr for 1 hour. Then the pressure of the reactor is decreased to 0.05 torr and left for 1 hour. A polycarbonate resin having a weight average molecular weight of 23,000 g/mol is obtained.

PREPARATION EXAMPLE 2

Preparation of Polycarbonate Resin 3.0 kg of 2,2-bis(4-hydroxyphenyl)propane (bisphenol A) is dissolved in a 5 to 10% NaOH solution, and then 10 L of methylene chloride is added thereto. 1.3 kg of phosgene is added to the solution and reacted at 20° C. and atmospheric pressure for 6 hours. After the reaction terminated, the resin, in an emulsion state, is neutralized with hydrochloric acid and cleaned with water, followed by centrifugation to separate the water and methylene chloride, thereby preparing a polycarbonate resin having a weight average molecular weight of 23,000 g/mol.

EXAMPLE 1

Preparation of Polycarbonate Resin Composition

The polycarbonate resin prepared in Preparation Example 1, 2-(2H-benzotriazolyl)-4-(1,1,3,3-tetramethylbutyl)phenol as a first UV stabilizer, 2,2'-methylenebis[6-(2H-benzotriazol-2-yl)-4-(1,1,3,3-tetramethylbutyl)phenol] as a second UV stabilizer, tetraethyl 2,2'-(1,4-phenylenedimethylidyne) bismalonate as a third UV stabilizer, and tris(2,4-di-tert-butylphenyl)phosphate as a phosphorus heat stabilizer are mixed according to the composition listed in Table 1, thereby preparing a resin composition.

EXAMPLES 2 AND 3

Preparation of Polycarbonate Resin Composition

Resin compositions are prepared in the same manner as in Example 1 except that dodecyl p-toluene sulfonic acid ester as a sulfonic acid compound, the polycarbonate resins prepared in Preparation Examples 1 and 2, and the UV stabilizers are mixed according to compositions listed in Table 1.

COMPARATIVE EXAMPLES 1 TO 6

Preparation of Polycarbonate Resin Composition

Resin compositions are prepared in the same manner as in Example 1 except that the components are mixed according to compositions listed in Table 1.

TABLE 1

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| Polycarbonate resin (parts by weight) | 100 | 100 | 100 | 100 | 100 | 100 | 100 | 100 | 100 |
| First UV stabilizer (phr) | 0.1 | 0.1 | 0.1 | 0.4 | — | — | 0.2 | 0.2 | — |
| Second UV stabilizer (phr) | 0.15 | 0.15 | 0.15 | — | 0.4 | — | 0.2 | — | 0.2 |
| Third UV stabilizer (phr) | 0.15 | 0.15 | 0.15 | — | — | 0.4 | — | 0.2 | 0.2 |
| Sulfonic acid compound (phr) | — | 0.0005 | 0.0005 | — | — | — | — | — | — |
| Phosphorus heat stabilizer (phr) | 0.05 | 0.05 | 0.05 | 0.05 | 0.05 | 0.05 | 0.05 | 0.05 | 0.05 |

EXPERIMENTAL EXAMPLE

Evaluation of Physical Properties

Each of the polycarbonate resin compositions prepared in Examples and Comparative Examples is extruded at 270° C. using a biaxial extruder having L/D=30 and Φ=45 and formed into pellets using a pelletizer. Physical properties of the pellets are measured, and results are illustrated in Table 2.

<Methods of Evaluation of Physical Properties>

1. Initial Yellowness Index (YI)

The pellets are formed into a 2.5 mm thick specimen at a molding temperature of 290° C. and a mold temperature of 70° C. using an injection molder (DHC 120WD, 120 ton, Dongshin Hydraulics Co.). The yellowness index of the specimen is measured in accordance with ASTM D1925 using a color difference meter (ND-1001DP, Nippon Denshoko Kogyo Co., Ltd).

2. Heat Stability (ΔYI)

After staying in a cylinder at a molding temperature of 320° C. and a mold temperature of 70° C. for 5 minutes, the pellets are formed into a specimen using the injection molder. The yellowness indices of a specimen before staying and of the specimen after staying are measured by ASTM D1925, thereby evaluating a change in yellowness index (ΔYI). Further, occurrence of silver in the specimen is evaluated.

3. Weather Resistance (ΔYI)

The specimen obtained using the injection molder is subjected to irradiation of light with a wavelength of 340 nm and an intensity of 0.35 W/m$^2$ for 1,000 hours using ATLAS Model CI 65. The yellowness indices of a specimen before irradiation and of the specimen after irradiation are measured by ASTM D1925, thereby evaluating a change in yellowness index (ΔYI).

4. Visible Light Transmittance

The specimen (thickness: 2.5 mm) obtained using the injection molder is evaluated in terms of visible light transmittance using a hazemeter (BYK-Gardner, Gmbh 4725).

5. Molecular Weight Retention Rate under Moist Heat

A specimen is left at 95° C. and 100% humidity for 16 hours. Thereafter, a change in the molecular weight of the specimen from before and after exposure to 95° C. and 100% humidity for 16 hours is measured using a high-pressure speed moist heat detector (JEIO B&P, PKEQ-50).

6. UV Stabilizer Remaining Rate

The content of stabilizers remaining in the pellets is measured using gas chromatography and the rate of stabilizers remaining is calculated based on the content of the added stabilizers.

TABLE 2

|  |  | Example | | | Comparative Example | | | | | |
| --- | --- | --- | --- | --- | --- | --- | --- | --- | --- | --- |
|  |  | 1 | 2 | 3 | 1 | 2 | 3 | 4 | 5 | 6 |
| Initial yellowness index | | 2.9 | 2.8 | 2.9 | 4.5 | 5.2 | 4.0 | 4.1 | 4.3 | 4.7 |
| heat stability after exposure to high temperature | Change in yellowness index | 2.3 | 1.8 | 1.9 | 3.3 | 2.5 | 3.0 | 3.2 | 3.2 | 2.8 |
| | Occurrence of silver | Slight | None | None | Slight | None | Considerable | Slight | Considerable | Slight |
| Weather resistance | Change in yellowness index | 6.8 | 6.7 | 6.8 | 8.3 | 8.8 | 8.7 | 8.5 | 8.5 | 8.8 |
| Visible light transmittance (%) | | 87.2 | 89.5 | 86.4 | 87.8 | 87.3 | 88.1 | 87.5 | 88.0 | 88.1 |

TABLE 2-continued

|  | Example | | | Comparative Example | | | | | |
|---|---|---|---|---|---|---|---|---|---|
|  | 1 | 2 | 3 | 1 | 2 | 3 | 4 | 5 | 6 |
| Molecular weight retention rate under moist heat (%) | 96.5 | 98.3 | 98.4 | 96.5 | 95.5 | 96.0 | 96.0 | 96.1 | 96.3 |
| UV stabilizer remaining rate (%) | 88.5 | 94.8 | 95.0 | 80.1 | 82.5 | 86.9 | 81.0 | 83.3 | 84.4 |

As shown in Table 2, the polycarbonate resin compositions according to Examples 1 to 3 have excellent initial yellowness index, heat stability after storage at high temperature, and weather resistance. Particularly, the polycarbonate resin compositions of the present invention have remarkably improved visible light transmittance. However, the compositions using only one kind of stabilizer according to Comparative Examples 1 to 3 and the compositions using a mixture of two stabilizers according to Comparative Examples 4 to 6 have inferior heat stability after storage at high temperature or weather resistance and particularly improper visible light transmittance.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:
1. A polycarbonate resin composition comprising:
a polycarbonate resin;
a first benzotriazole UV stabilizer represented by Formula 1,

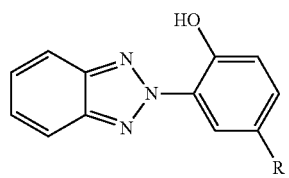

[Formula 1]

wherein R is hydrogen, linear or branched C1 to C20 alkyl, C6 to C20 aryl, or C6 to C 20 aryl substituted by C1 to C10 alkyl;
a second benzotriazole UV stabilizer represented by Formula 2,

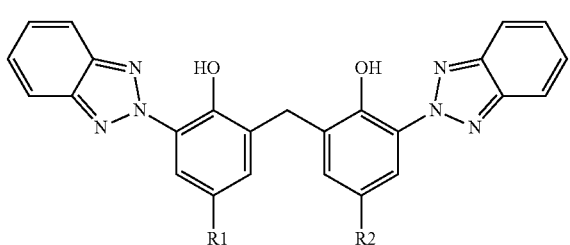

[Formula 2]

wherein R1 and R2 are the same or different and are each independently hydrogen, linear or branched C1 to C20 alkyl, C6 to C20 aryl, or C6 to C20 aryl substituted by C1 to C10 alkyl;
a bismalonate UV stabilizer represented by Formula 3,

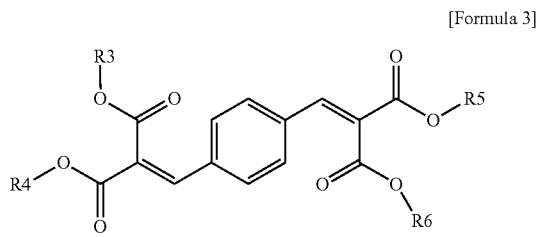

[Formula 3]

wherein R3, R4, R5, and R6 are the same or different and are each independently hydrogen, linear or branched C1 to C20 alkyl, C6 to C20 aryl, or C6 to C20 aryl substituted by C1 to C10 alkyl; and
a phosphorus heat stabilizer.

2. The polycarbonate resin composition of claim 1, comprising the first benzotriazole UV stabilizer in an amount of about 0.05 to about 0.3 phr based on about 100 parts by weight of the polycarbonate resin.

3. The polycarbonate resin composition of claim 1, comprising the second benzotriazole UV stabilizer in an amount of about 0.05 to about 0.3 phr based on about 100 parts by weight of the polycarbonate resin.

4. The polycarbonate resin composition of claim 1, comprising the bismalonate UV stabilizer in an amount of about 0.05 to about 0.3 phr based on about 100 parts by weight of the polycarbonate resin.

5. The polycarbonate resin composition of claim 1, comprising the first benzotriazole UV stabilizer, the second benzotriazole UV stabilizer, and the bismalonate UV stabilizer at a weight ratio of about 1:1 to about 3:1 to about 3.

6. The polycarbonate resin composition of claim 1, wherein the polycarbonate resin is prepared by transesterification of an aromatic dihydroxyl compound or an aromatic carbonate derivative compound and diaryl carbonate in the presence of an alkali metal catalyst, an alkaline earth metal catalyst, or a combination thereof.

7. The polycarbonate resin composition of claim 1, wherein the phosphorus heat stabilizer comprises tris(2,4-di-tert-butylphenyl)phosphate, triethyl phosphate, trimethyl phosphate, diphenyl isooctyl phosphite, distearyl pentaerythritol diphosphite, or a combination thereof.

8. The polycarbonate resin composition of claim 1, comprising the phosphorus heat stabilizer in an amount of about 0.01 to about 0.2 phr based on about 100 parts by weight of the polycarbonate resin.

9. The polycarbonate resin composition of claim 1, wherein the resin composition further comprises a sulfonic acid compound.

10. The polycarbonate resin composition of claim 9, wherein the sulfonic acid compound is represented by Formula 4:

[Formula 4]

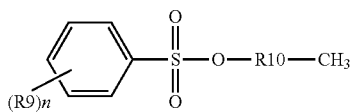

wherein each R9 is the same or different and is independently C1 to C20 alkyl or halogen substituted C1 to C20 alkyl, R10 is C11 to C20 alkylene or halogen substituted C11 to C20 alkylene, and n is an integer from 0 to 5.

11. The polycarbonate resin composition of claim 9, wherein the sulfonic acid compound is present in an amount of about $1\times10^{-5}$ to about $5\times10^{-3}$ phr based on about 100 parts by weight of the polycarbonate resin.

12. The polycarbonate resin composition of claim 1, wherein a specimen formed of the resin composition has a change in yellowness index ($\Delta$YI) of about 2.4 or less as measured by ASTM D1925 after storage at about 320° C. for about 5 minutes.

13. The polycarbonate resin composition of claim 1, wherein a specimen formed of the resin composition has a change in yellowness index ($\Delta$YI) of about 8.2 or less as measured by ASTM D1925 after subjected to irradiation of light with a wavelength of about 340 nm and an intensity of about 0.35 W/m$^2$ for about 1,000 hours.

14. The polycarbonate resin composition of claim 1, wherein a specimen formed of the resin composition has a visible light transmittance of about 86% or more at a thickness of about 2.5 mm.

15. The polycarbonate resin composition of claim 1, wherein the resin composition further comprises at least one additive selected from the group consisting of antimicrobial agents, release agents, antioxidants, compatibilizers, inorganic additives, fillers, plasticizers, impact modifiers, admixtures, coloring agents, stabilizers, lubricants, anti-static agents, pigments, weather proof agents, UV blocking agents, and combinations thereof.

16. A molded product formed of the resin composition of claim 1.

* * * * *